United States Patent
Mongis et al.

(10) Patent No.: US 10,875,129 B2
(45) Date of Patent: Dec. 29, 2020

(54) METHOD FOR PRODUCING A SEALING COMPONENT WITH A BODY MADE OF BORON-CONTAINING SUPERALLOY AND COATED

(71) Applicant: Safran Aircraft Engines, Paris (FR)

(72) Inventors: Thomas Guillaume Mongis, Moissy-Cramayel (FR); Christophe Joël Lopvet, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 81 days.

(21) Appl. No.: 15/771,950

(22) PCT Filed: Oct. 18, 2016

(86) PCT No.: PCT/FR2016/052693
§ 371 (c)(1),
(2) Date: Apr. 27, 2018

(87) PCT Pub. No.: WO2017/072431
PCT Pub. Date: May 4, 2017

(65) Prior Publication Data
US 2018/0339373 A1    Nov. 29, 2018

(30) Foreign Application Priority Data
Oct. 29, 2015 (FR) ...................................... 15 60385

(51) Int. Cl.
*F01D 5/00* (2006.01)
*B23K 35/30* (2006.01)
(Continued)

(52) U.S. Cl.
CPC ........ *B23K 35/3046* (2013.01); *B23K 1/0018* (2013.01); *B23P 6/005* (2013.01);
(Continued)

(58) Field of Classification Search
CPC .............. B23K 35/3046; B23K 1/0018; B23K 2101/001; B23P 6/005; F01D 5/005;
(Continued)

(56) References Cited

U.S. PATENT DOCUMENTS

| | | | |
|---|---|---|---|
| 6,914,210 B2 * | 7/2005 | Grossklaus, Jr. ...... | B23K 10/02 219/121.45 |
| 7,653,994 B2 | 2/2010 | Dasilva et al. | |

(Continued)

FOREIGN PATENT DOCUMENTS

| | | |
|---|---|---|
| CN | 101037552 A | 9/2007 |
| CN | 101053897 A | 10/2007 |

(Continued)

*Primary Examiner* — Lawrence Averick
(74) *Attorney, Agent, or Firm* — Blank Rome LLP

(57) ABSTRACT

A method for producing a sealing component has a body made of superalloy covered by a coating to be placed in contact with a gas turbine blade tip. Steps are carried out in which:
a) the new coating is produced by moulding from an alloy of a cobalt-nickel-chromium-aluminium-yttrium (CoNiCrAlY) type further containing between 0.5 and 5% by mass (wt %) of boron, and
b) the superalloy body and the new coating are brazed together in order to obtain the said sealing component.

20 Claims, 1 Drawing Sheet

(51) Int. Cl.
  *B23K 1/00*      (2006.01)
  *B23P 6/00*      (2006.01)
  *F01D 11/12*     (2006.01)
  *B23K 101/00*    (2006.01)

(52) U.S. Cl.
  CPC ............ *F01D 5/005* (2013.01); *F01D 11/122* (2013.01); *B23K 2101/001* (2018.08); *F05D 2230/21* (2013.01); *F05D 2300/173* (2013.01)

(58) Field of Classification Search
  CPC ... F01D 11/122; F05D 2230/21; C23C 4/073; C23C 4/129; C23C 4/18
  USPC .......... 228/119, 245–262; 29/889.1–889.722
  See application file for complete search history.

(56) References Cited

U.S. PATENT DOCUMENTS

| | | | |
|---|---|---|---|
| 8,365,405 B2 * | 2/2013 | Minor .................... | B23P 6/005 29/402.02 |
| 2004/0023056 A1 | 2/2004 | Braillard et al. | |
| 2004/0084423 A1 * | 5/2004 | Grossklaus, Jr. ...... | B23K 10/02 219/121.45 |
| 2010/0050408 A1 * | 3/2010 | Minor .................... | B23P 6/005 29/402.13 |
| 2011/0117385 A1 | 5/2011 | Minor et al. | |

FOREIGN PATENT DOCUMENTS

| | | |
|---|---|---|
| EP | 1 416 063 A1 | 5/2004 |
| EP | 2 065 565 A2 | 6/2009 |
| EP | 2 159 460 A1 | 3/2010 |
| WO | WO 02/42610 A2 | 5/2002 |

\* cited by examiner

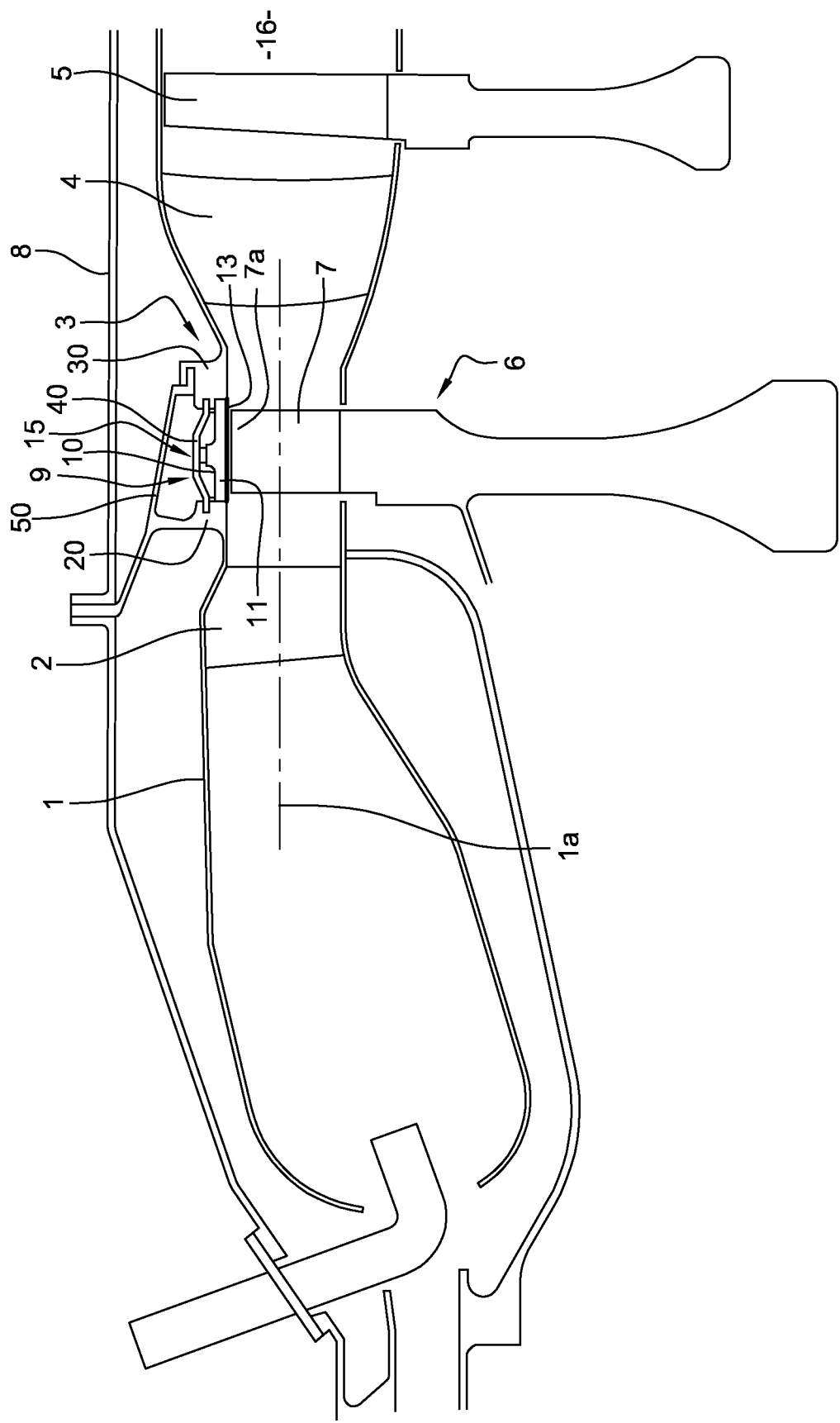

METHOD FOR PRODUCING A SEALING COMPONENT WITH A BODY MADE OF BORON-CONTAINING SUPERALLOY AND COATED

CROSS-REFERENCE TO RELATED APPLICATIONS

This application is a national stage of International Application No. PCT/FR2016/052693, filed on Oct. 18, 2016, which claims the benefit of French Patent Application No. 1560385, Oct. 29, 2015, the contents of each of which are incorporated herein by reference.

TECHNICAL FIELD

The invention relates to the general field of stationary ring assemblies of a gas turbine. It more particularly relates to the manufacture or repair of such stationary casing or ring assemblies of a high-pressure turbine of a turbine engine.

BACKGROUND

In gas turbine engines which are concerned here, pressurized air and fuel are burnt in a combustion chamber to add thermal energy to circulating gases.

The effluents from the chamber comprise high temperature gases which flow in the downstream direction along an annular flow path through the engine turbine section.

At the turbine inlet following the combustion chamber, gases are directed to a series of blades which radially extend outwards from the engine rotor, with the radial direction being defined relative to the general axis of rotation of the engine.

An annular shroud which is supported by the turbine case surrounds the radially outer ends of such blades to contain the gases in the created flow passage.

The free radial space between such blade ends or tips and the shroud is minimized to prevent leakage of gas around said tips.

As mentioned above, stationary rings provide a friction surface for the blade tips.

It is then desired that the blade tips rub the surfaces of sealing lugs or plates which typically cover, in a radially internal manner relative thereto, the bodies of said rings, thus reducing the amount of air that can bypass the turbine blades.

Minimizing such amount of by-pass air increases the engine efficiency.

A secondary function of the ring is to thermally protect the external environment relative to the hot gas flow passage.

Thus, the ring must be so designed as to be resistant to both corrosion and oxidation caused by the hot gases and mechanical erosion caused by friction. The wear of the coating thereof is thus a problem.

When originally manufacturing the new part, the lugs or plates, which cover the body rings, are typically deposited as a coating on such bodies using a so-called HVOF (High Velocity Oxy Fuel) technique.

As is known, HVOF is a dry surface treatment technique. In this thermal spray system, a carrier gas is used to accelerate and transport fine particles (of typically 5 to 500 microns) which can be in the liquid, pasty, or solid state, to the substrate. Such carrier gas may also be an enthalpy source for heating said particles up to the melting point thereof. An electric arc can also be used to melt the material. The particles thus projected onto the substrate crash according to the speed, physical state, temperature etc. thereof. The accumulation of such particles on the substrate makes it possible to obtain the coating.

The main disadvantage of HVOF is that it is uncommon and difficult to implement. Specifically, the equipment settings are difficult to achieve. And the surface state of the ring body must be oxide free for a good bonding with the coating. Besides, a sandblasted (rough) state is required for a good bonding and a good anchoring of the HVOF deposition.

Now, it is clear from the foregoing that either the whole part (the ring and the coating), or the coating only will have to be replaced some time, in order to restore the engine performances. This will also be true even though the ring concerned is not the ring of a HP turbine.

In a parts repair process, in this case a so-produced ring that will preferably be repaired rather than replaced, two problems will arise: first, this is an uncommon approach; furthermore, no trace of the former HVOF deposition should be left, which would require a thorough machining of the base material (ring body). This is a serious constraint. HVOF is thus not suitable for a repair of the ring.

SUMMARY

An alternative solution has to be found, all the more so that since the typical material of a ring body is a superalloy, an expensive and hard to machine material.

Then, the following steps are then provided to thus produce a sealing component, whether new or repaired, which comprises a body made of a superalloy coated (typically on one side) with a new coating to be positioned in contact with a blade tip of a gas turbine:

a) said new coating is obtained by moulding an alloy of a Cobalt-Nickel-Chrome-Aluminium-Yttrium (CoNi-CrAlY) type which further containing from 0.5 to 5% by weight (wt %) of boron (B), b) and the body made of superalloy and said new coating are brazed together so as to obtain said sealing component.

The present invention also aims at the specific production of a turbine ring comprising a body covered with a coating, with such production method being in accordance with the foregoing, with potentially all or part of the additional features that follow, with said superalloy body and said new coating, once brazed together according to step b), constituting respectively those of said ring which thus defines a sealing component.

A general advantage of this solution is that brazing permits a surface state with a little oxide or without a finely sand-blasted surface state; traces of CoNiCrAlY are acceptable, which makes it possible to machine the body material less thoroughly, prior to brazing. Therefore, when using such technique, it will be possible to repair the ring a greater number of times than if the new coating had been coated on the superalloy body using HVOF deposition.

Another advantage is that the brazed coating has a thicker scattering layer, which improves the coating holding on the superalloy body. With HVOF depositions, the spalling phenomenon may occur on the coating, if the surface state is not perfectly sand-blasted.

Besides, HVOF requires a very long projection time; and the deposition may peel off.

Brazing shall advantageously be a hard soldering. For the record, brazing is an assembling operation which consists in joining items using a filler metal in a liquid state, having a melting temperature lower than that of the items to be joined, and wetting the base material which does not participate in the forming of the joint when melting. Brazing produces chemically and structurally heterogeneous bonds. Brazing becomes hard soldering when it uses filler metals having melting points above 450° C.

For the record, and for information, the ISO 4063 standard relates to brazing.

As may have been noted, the technique used in the above solution can also be used to produce a new sealing component.

If a repair is concerned, the first repair will advantageously be executed with the following steps:
  c) prior to step b) said damaged coating is removed from a previously used sealing component which had been newly produced with a body made of a superalloy coated with a damaged coating made of an a priori boron-free alloy of the Cobalt-Nickel-Chromium-Aluminum-Yttrium (CoNiCrAlY) type,
  d) step b) is then executed, wherein the body 3 made of a superalloy and said new coating 1 containing boron are brazed together, instead of the removed damaged coating.

When manufacturing the new part, the body will thus be previously covered with the coating by HVOF deposition or by brazing already. Then, to produce a new part, brazing will be executed directly on the superalloy body, as a complete substitution to HVOF. HVOF will then no longer be used.

In case of a subsequent (second, third . . . ) repair, the operations will preferably be executed as follows:
  c) prior to step b) said damaged coating is removed from a previously used sealing component (the manufacturing technique of which may no longer be identifiable) having a body made of a superalloy coated with a damaged coating made of an alloy of the Cobalt-Nickel-Chromium-Aluminum-Yttrium (CoNiCrAlY) type, further containing from 0.5 to 5% by weight (wt %) of boron,
  d) step b) will then be executed, wherein the body made of a superalloy and said new coating containing boron are brazed together, instead of the removed damaged coating.

The invention also relates to a method for producing a new sealing component comprising a body made of a superalloy covered with a new coating which can be so positioned as to contact the blade end of a gas turbine.

In this case, the implemented method will comprise steps wherein:
  a) said new coating is obtained by moulding an alloy of a Cobalt-Nickel-Chrome-Aluminium-Yttrium (CoNiCrAlY) type further containing from 0.5 to 5% by weight (wt %) of boron,
  b) the body made of a superalloy is covered with said new coating by HVOF deposition, so as to obtain said sealing component.

Conclusive results have especially been obtained when the body superalloy material was AM1. Another superalloy can also be used: RENE N5.

As the superalloy body and said new coating containing boron can be brazed together, it is also advised, in order to take the best advantage of the presence of boron, to preferably carry out such brazing at a temperature lower than the complete solution temperature of the γ' phase of the body material, of the Ni3Al type, in the preferred embodiment, and/or preferably at a temperature between 1,000° C. and 1,300° C., with such γ' phase providing most of the mechanical characteristics of the superalloy.

And still to optimize the brazing quality, it is recommended that the alloy of the Cobalt-Nickel-Chromium-Aluminium-Yttrium (CoNiCrAlY) type of the coating should have the following composition by weight (wt %):

| Ni | Cr | Al | Y | Other component(s) (max) | Co |
|---|---|---|---|---|---|
| 29.0-35.0 | 18.0-24.0 | 5.0-11.0 | 0.1-0.8 | 0.5-1.0 | complements to 100 |

The «Other component(s) max part: 0.5-1.0 wt %» refers to impurities.

For the same purpose, it is advised that the quantity by weight (wt %) of boron in the alloy of the Cobalt-Nickel-Chromium-Aluminum-Yttrium (CoNiCrAlY) type of the coating ranges from 1.7% to 2.5%, and preferably from 1.9% to 2.2%.

This will be in particular suitable with a body made of AM1, as it will be (even though another superalloy is selected for the body) if said brazing of the new coating containing boron is brazed at a temperature between 1,000° C. and 1,250° C. and preferably between 1,150° C. and 1,210° C.

A difficulty which arises when manufacturing the coating made of alloy of the Cobalt-Nickel-Chromium-Aluminum-Yttrium (CoNiCrAlY) type will also be produced by using metal injection molding (MIM) of a plate with a sintered thermally densified (TDC) coating.

As a matter of fact, tests have shown (see below) that a new coating deposited by brazing a TDC plate has the same characteristics as a coating deposited by HVOF as regards abradability, hardness and porosity.

BRIEF DESCRIPTION OF THE DRAWINGS

A further description will now be given, while referring more particularly to FIG. 1 which shows a longitudinal (axial) section of a portion of a turbine engine.

DETAILED DESCRIPTION

Even though the invention can apply to another environment, the application of the invention to an HP turbine will be discussed hereunder, since the sealing and temperature constraints are high therein.

FIG. 1 very schematically shows, in the downstream direction of the gas flow in a gas turbine, along the longitudinal axis 1a of the turbine engine, a combustion chamber 1, a turbine nozzle 2 positioned at the outlet of the combustion chamber, a high-pressure (HP) turbine 3, a flow straightener 4 and a first stage of a low pressure (BP) turbine 5.

The HP turbine 3 comprises a turbine wheel 6 mobile in rotation about the axis 1a and carrying blades 7 and a turbine ring assembly. The blades 7 are made of a single crystal Ni-based superalloy; in the preferred embodiment made of AM1.

The turbine ring assembly includes a turbine ring 10 which is therefore a sealing component.

Typically, the ring of such a stationary ring assembly is sectorized, i.e. it consists of a plurality of circumferentially butt joined segments, about the axis 1a.

The stationary ring assembly thus locally defines one (the radially outer one) of the walls of the hot gases flow flow passage 16 from the combustion chamber 1 of the turbine engine and going through the turbine.

To withstand the imposed temperature, the turbine ring 10 comprises a body 11 covered with a brazed coating 13 opposite the blades 7. At least the coating 13 is sectorized. The body 11 is made of a single crystal Ni-based superalloy; in the preferred embodiment, made of AM1.

According to the operating conditions, and particularly when the turbine engine is operating, the blades 7 come into contact with the coating 13 at their free ends 7a.

Typically, the turbine ring 10 is attached to the turbine casing 8, which is radially outside relative to the blades, by means of a spacer system.

As shown in FIG. 1, the ring 10 can thus be supported by a metal support structure 15. The support structure 15 may for example comprise a first annular upstream 20 support and a second annular downstream 30 support, which axially clamp the ring 10 between themselves, and a metal crown 40 clamped by the supports 20, 30 and which surrounds the ring. One branch 50 connects and attaches the supports 20, 30 to the turbine casing 8.

The turbine ring 10 provided with the body 11 covered with the coating 13 can result from manufacturing, thus be a new part.

The brazed coating 13 can also be a spare part, even though the coating is new, in that it will then replace, on the body 11, a former damaged coating.

Two assumptions can be made in this case:
either it was an old coating having the same composition as the new brazed coating 13,
or it was an old coating having a different composition.

As a matter of fact, one advantage of the brazed coating 13 is that it may have been brazed to replace either an identical coating (as regards composition) previously brazed on the body 11, or an original coating having a different composition.

In the latter case, the brazed coating 13 a priori replaces a damaged coating made of a boron-free alloy of the Cobalt-Nickel-Chromium-Aluminum-Yttrium (CoNiCrAlY) type, coating a body 11 made of a superalloy, typically a body made of AM1, during the original manufacturing of the turbine ring 10.

As a matter of fact, to date it is typical to manufacture a new ring 10 by covering the body 11 thereof with such a coating of the CoNiCrAlY type via a HVOF (High Velocity Oxy Fuel/high speed "oxyfuel» method) deposition but with the already exposed drawbacks which can be summarized in that, once damaged, HVOF is not a technique suitable for repairing the ring 10. Specifically, a risk of detachment of the HVOF coating exists if the sandblasting surface preparation is inadequate.

Under these conditions, the proposed alternative solution aiming at restoring the coating of the body 11 is, as already mentioned:
a) manufacturing the new coating 13 by moulding an alloy of the Cobalt-Nickel-Chrome-Aluminium-Yttrium (CoNiCrAlY) type which further contains from 0.5 to 5% by weight (wt %) of boron,
b1) removing the remains of the damaged coating from the body,
b2) then brazing the body 11 made of the superalloy and the new coating together, which will make it possible to restore an adapted sealing component 10.

The new coating is then machined to reach the desired dimensions.

Typically, to remove the remains of the damaged coating, the concerned face of the body 11 has been machined, so as to remove the CoNiCrAlY material still present.

In this regard, it should be reminded that a ring can specifically be repaired more easily and many more times by brazing, in particular using a MIM plate containing boron than HVOF. From the second repair on, brazing on TDC traces will not raise further problems associated with HVOF.

Manufacturing a new coating 13 from a plate with a sintered thermally densified coating (TDC) manufactured by MIM (Metal Injection Molding) is an interesting practical solution in terms of quality of the finished part and easy, reliable and safe manufacturing.

In parallel with the preparation of the surface of the body 11 to be brazed, a series of TDC plates matching the correct chemical composition of the coating and the dimensions to be complied with will then advantageously be manufactured. In this regard, the plates will preferably be slightly larger than the body of the ring with (substantially) the same rounding as the inner surface of the body 11 to be brazed.

For the record, MIM is a metallic powders injection molding. The metal (typically the alloy) is mixed with a binder, and then injected into a mould; the part is then "debinded" (chemical decomposition of the binder) in a furnace under controlled atmosphere, and then sintered in a vacuum furnace. Sintering is executed at high temperature, for instance 1,250-1,350° C. for a few hours, so as to obtain the cohesion of the metal particles, and causes the densification of the material and the resistance of parts. This technique has the advantage of making it possible to create complex shapes with a good surface state and fine tolerances. Extremely homogeneous alloys, which have a very good resistance to corrosion, among other properties can be created.

One of these TDC MIM plates is then placed on the machined face of the body 11 as the new coating 13.

The assembly is then brazed in a furnace (i.e. in a second partial vacuum; typically less than $10^{-2}$ Pa) before the coating 13 is machined to the correct dimensions.

For brazing to be efficient, the materials of the coating 13 and of the body 11 have of course been so selected as to be brazeable together.

In particular with an alloy of the Cobalt-Nickel-Chromium-Aluminum-Yttrium (CoNiCrAlY) type having the above composition in weight, and therefore containing boron between 0.5 and 5% by weight (wt %), a single crystal body made of AM1 or Rene N5 (Ni-based superalloys) will be suitable, for instance.

Brazing will advantageously be executed at a temperature lower than the complete solution temperature of the γ' phase (here of the Ni3Al type) of the body material, and/or preferably at a temperature between 1,000° C. and 1,300° C.

Such complete solution temperature, i.e. austenitizing temperature, which makes it possible to dissolve the various soluble components in the solid solution and thus to preserve the properties of the material, is thus the temperature below which brazing must be executed to obtain the expected results: the quality of brazing, resistance over time.

The alloy of the new coating 13 compatible with the base material of the body 11 will advantageously have a melting point below the melting point of the base material.

The brazing temperature can also be so selected below the melting temperature of the body material, for safety and ease of implementation; i.e. about 1,385° C. for Rene N5 or AM1, for example.

Actually, with a body made of AM1, and all the more so if, as the inventors' considerations and the results below so suggest, the quantity by weight (wt %) of boron in the alloy of the coating of the Cobalt-Nickel-Chromium-Aluminum-Yttrium (CoNiCrAlY) type is between 1.7% and 2.5%, preferably between 1.9% and 2.2%, the brazing of the new coating 13 containing boron will advantageously be executed at a temperature between 1,000° C. and 1,250° C., and preferably between 1,150° C. and 1,210° C.

One of the main difficulties arising from the fact that CoNiCrAlY has to be brazed at a temperature of 1,230° C. minimum will thus be overcome. Now, various superalloys, including AM1, cannot be subjected to so high a temperature.

Including boron in the conditions mentioned above will make it possible to lower the brazing temperature. And a proportion of boron between 1.7 and 2.5 wt %, with a preference for 1.9 to 2.2 wt %, has been significantly favorable to good wettability of CoNiCrAlY on the part and a scattering zone in compliance with the subsequent use of the part, with the percentage of boron mentioned having been set relative to the (range of) brazing temperature(s) mentioned above; see the following results with 1.5% boron (insufficient wettability of the plate on the AM1 substrate) and 2.5% boron (the CoNiCrAlY plate collapses and no preservation of the preform suitable to a subsequent machining).

It actually turned out that using CoNiCrAlY alloy with the planned addition of boron (thus between 0.5 and 5 wt %, with a preference for 1.7 to 2.5 wt %) actually corresponds to a brazing of the cobalt-based alloy type with a percentage of boron in phase with a nickel-based or cobalt-based type brazing; see the RBD 61 and RBD 191 compositions below (in wt %).

| RBD 191: | | | | | | | | |
|---|---|---|---|---|---|---|---|---|
| Elements | Co | Ni | Cr | W | Si | B | C | P |
| Mini | Base | 27 | 17.2 | 4.5 | 1.2 | 0.8 | 0.3 | |
| Maxi | | 30 | 18.6 | 5.6 | 1.5 | 0.95 | 0.40 | 0.04 |

| RBD 61: | | | | | | | | | | |
|---|---|---|---|---|---|---|---|---|---|---|
| Elements | Ni | Co | Cr | Mo | Al | Ti | Si | B | C | Zr | P |
| Mini | Base | 16.5 | 10.4 | 3.3 | 2.85 | 2.45 | 1 | 0.68 | | | |
| Maxi | | 19 | 12.2 | 4.2 | 3.15 | 2.8 | 1.30 | 0.8 | 0.06 | 0.05 | 0.01 |

Besides, feasibility tests with silicon instead of boron have not provided results in compliance with the scattering area (porosity phenomena); hence the confirmed selection of boron, in the mentioned conditions.

The thickness of the new coating 13 will advantageously be between 2.5 and 8.5 mm, preferably 3 and 5 mm.

Brazing tests on TDC plates (coating 13) manufactured by MIM, made of CoNiCrAlY, on rings made of AM1 have been made.

If the filler metal is supplied as a powder, using a binder is recommended. The powder+binder mixture should be smooth and homogeneous, and should not contain excess binder. The binder must make it possible to hold the filler metal on the assemblies up to the brazing temperature.

The TDCs used for repairing the parts were a mixture of CoNiCrAlY alloy (Amdry 995 Powder) and boron. Three tests have been conducted with various boron contents (1.5% to 2.5 wt %).

For the record, a TDC is a plate with a preform matching the receiving part, having dimensions greater than the part to be achieved.

The TDC plates have thus been manufactured using a MIM process, with the following steps, using a furnace brazing in a partial high vacuum:

manufacturing 3 parts (CoNiCrAlY+B mixture);
shaping three series of TDCs with various B contents by weight (1.5%, 2% and 2.5%);
chemical debinding;
thermal debinding using H2, with a 1-hr stop at 1,000° C. for pre-sintering TDCs;
standard brazing for 15 min at 1,210° C.+2 hrs at 1,060° C. of TDCs on the support part made of AM1.

Upon completion of the thermal debinding and pre-sintering treatments, the TDCs placed on the outside of the furnace had a surface oxidation.

The results showed that 2% (by weight) of B in CoNiCrAlY makes it possible to lower the brazing temperature to 1,210° C. Such temperature is almost the acceptable upper limit for AM1. This is in fact the standard temperature of other parts repair cycles; several types of parts can thus be grouped in the same batch. Besides, 2% boron (optimum value) provides good wettability; neither too much nor too little, which improves the strength of the coating and of the scattering layer. The maximum permissible temperature for brazing AM1 will be 1,230° C.

For 1.5%, a sufficient decrease in the brazing T° C. is not obtained. Wettability is hardly acceptable.

And for 2.5%, high wettability and a deterioration of the plate shape were observed; but this is not prohibitive.

When referring to the above, but also to the inventors' experience and knowledge, it can be estimated that the boron content range is [1.7 to 2.5 wt %] with a preference for [1.9 to 2.2 wt %].

The coatings deposited by brazing a TDC plate had the same characteristics as a coating deposited by HVOF as regards abradability, hardness and porosity.

Tests have shown that the new coating deposited by brazing a TDC plate had the same characteristics as a coating deposited by HVOF as regards abradability, hardness and porosity.

A benefit was found in that, once brazed, the coating 13 creates a larger scattering layer than a HVOF deposition, which improves the strength of the coating on the support part (made of AM1 in the tests), which was flawless upon deposition.

The invention claimed is:

1. A method for producing a sealing component comprising a body made of a superalloy covered with a new coating formed of a mixture of an alloy and boron, which can be so positioned as to contact a blade end of a gas turbine, wherein the method comprises the following steps:
   a) said new coating is obtained by moulding, with the alloy in the mixture being of a Cobalt-Nickel-Chrome-Aluminium-Yttrium (CoNiCrAlY) type and boron being contained in a quantity by weight (wt %) from 1.7% to 2.5%, and b) the body made of superalloy and said new coating are brazed together so as to obtain said sealing component.

2. The method according to claim 1, wherein the sealing component produced in step b) is a repaired part obtained after executing the following steps:
c) prior to step b), a damaged coating is removed from a previously used sealing component which had been newly produced with a body made of a superalloy coated with a damaged coating made of an alloy of the Cobalt-Nickel-Chromium-Aluminum-Yttrium (Co Ni Cr Al Y) type, and
d) step b) is then executed, wherein the body made of a superalloy and said new coating containing boron are brazed together, instead of the removed damaged coating.

3. The method according to claim 2, wherein prior to step c), during the production of the repaired part, the body has been covered with the coating by HVOF deposition.

4. The method according to claim 1, wherein the sealing component produced in step b) is a repaired part obtained after executing the following steps:
c) prior to such step b) a damaged coating is removed from a previously used sealing component having a body made of a superalloy coated with a damaged coating made of an alloy of a Cobalt-Nickel-Chromium-Aluminum-Yttrium (CoNiCrAlY) type further containing from 0.5 to 5% by weight (wt %) of boron,
d) step b) is then executed, wherein the body made of a superalloy and said new coating containing boron are brazed together, instead of the removed damaged coating.

5. The method according to claim 4, wherein the previously used sealing component has been previously produced, as a newly produced sealing component, with a body covered, by means of a HVOF deposition or by brazing, with the coating which is, when damaged, removed at step c).

6. The method according to claim 5, wherein the material of the body made of a superalloy is a nickel-based superalloy of a single crystal type.

7. The method according to claim 6, wherein said brazing of the new coating containing boron is carried out at a temperature between 1,000° C. and 1,250° C.

8. The method according to claim 6, wherein said brazing of the new coating containing boron is carried out at a temperature between 1,150° C. and 1,210° C.

9. The method according to claim 5, wherein the material of the body made of a superalloy is nickel-based superalloy AM1.

10. The method according to claim 5, wherein the alloy of the Cobalt-Nickel-Chromium-Aluminum-Yttrium (CoNiCrAlY) type has the following composition by weight:

| Ni | Cr | Al | Y | Other component(s) (max) | Co |
|---|---|---|---|---|---|
| 29.0-35.0 | 18.0-24.0 | 5.0-11.0 | 0.1-0.8 | 0.5-1.0 | complements to 100. |

11. The method according to claim 5, wherein said quantity by weight (wt %) of boron ranges from 1.7% to 2.5%.

12. The method according to claim 5, wherein said quantity by weight (wt %) of boron ranges from 1.9% to 2.2%.

13. The method according to claim 5, wherein said coating made of an alloy of the Cobalt-Nickel-Chromium-Aluminum-Yttrium (CoNiCrAlY) type is produced by using metal injection molding (MIM) of a plate with a sintered thermally densified (TDC) coating.

14. The method according to claim 1, wherein in step b) of brazing the body made of a superalloy and the new coating containing boron, said brazing is carried out at a temperature lower than a complete solution temperature of a Υ' phase of the body made of a superalloy.

15. The method according to claim 1, wherein the alloy of the Cobalt-Nickel-Chromium-Aluminum-Yttrium (CoNiCrAlY) type has the following composition by weight:

| Ni | Cr | Al | Y | Other component(s) (max) | Co |
|---|---|---|---|---|---|
| 29.0-35.0 | 18.0-24.0 | 5.0-11.0 | 0.1-0.8 | 0.5-1.0 | complements to 100. |

16. The method according to claim 1, wherein said quantity by weight (wt %) of boron in the alloy of the Cobalt-Nickel-Chromium-Aluminum-Yttrium (CoNiCrAlY) type of the coating ranges from 1.9% to 2.2%.

17. The method according to claim 1, wherein said coating made of an alloy of the Cobalt-Nickel-Chromium-Aluminum-Yttrium (CoNiCrAlY) type is produced by using metal injection molding (MIM) of a plate with a sintered thermally densified (TDC) coating.

18. The method according to claim 1, wherein the sealing component is a turbine ring comprising a body covered with a coating, wherein said body made of a superalloy, and said new coating are those of said turbine ring which thus defines a sealing component, respectively.

19. The method according to claim 1, wherein in step b) of brazing the body made of a superalloy and the new coating containing boron, said brazing is carried out at a temperature between 1,000° C. and 1,300° C.

20. The method according to claim 2, wherein the damaged coating is an HVOF coating.

* * * * *